US005249421A

United States Patent [19]

Lunzman

[11] Patent Number: 5,249,421

[45] Date of Patent: Oct. 5, 1993

[54] HYDRAULIC CONTROL APPARATUS WITH MODE SELECTION

[75] Inventor: Stephen V. Lunzman, Chillicothe, Ill.

[73] Assignee: Caterpillar Inc., Peoria, Ill.

[21] Appl. No.: 819,914

[22] Filed: Jan. 13, 1992

[51] Int. Cl.[5] .............................................. F16D 31/02

[52] U.S. Cl. ........................................ 60/422; 60/427; 60/452

[58] Field of Search ................. 60/420, 445, 452, 422, 60/424, 426, 427

[56] References Cited

U.S. PATENT DOCUMENTS

| | | | |
|---|---|---|---|
| 4,196,588 | 4/1980 | Johnson | 60/445 |
| 4,343,151 | 8/1982 | Lorimor | 60/424 X |
| 4,856,278 | 8/1989 | Widmann et al. | 60/427 X |
| 4,967,557 | 11/1990 | Izumi et al. | 60/452 X |
| 5,048,293 | 9/1991 | Aoyagi | 60/452 X |
| 5,077,973 | 1/1992 | Suzuki et al. | 60/427 X |
| 5,079,919 | 1/1992 | Nakamura et al. | 60/427 X |
| 5,134,853 | 8/1992 | Hirata et al. | 60/452 X |
| 5,138,838 | 8/1992 | Crosser | 60/452 X |
| 5,146,746 | 9/1992 | Nagai et al. | 60/452 X |
| 5,152,143 | 10/1992 | Kajita et al. | 60/422 X |
| 5,174,114 | 12/1992 | Aoyagi | 60/426 X |
| 5,182,908 | 2/1993 | Devier et al. | 60/420 |

FOREIGN PATENT DOCUMENTS

| | | | |
|---|---|---|---|
| 59003 | 5/1981 | Japan | 60/452 |

*Primary Examiner*—Edward K. Look
*Assistant Examiner*—John Ryznic
*Attorney, Agent, or Firm*—James R. Yee

[57] ABSTRACT

An apparatus for controllably actuating at least two hydraulic actuator is provided. The apparatus controllably provides pressurized hydraulic fluid to the hydraulic actuators through closed center spool valves. The apparatus receives operating signals and a pump pressure signal and responsively controls the output of a variable flow pump. In a first mode, the output flow of the pump is a function of the operating signals and the pump pressure signal. In a second mode, the output flow of the pump is a function of the operating signals alone.

5 Claims, 4 Drawing Sheets

HYDRAULIC CONTROL APPARATUS WITH MODE SELECTION

TECHNICAL FIELD

This invention relates generally to an apparatus for controlling a hydraulic actuator and more particularly to an apparatus for controlling a hydraulic actuator using pump pressure feedback.

BACKGROUND ART

Hydraulic drive systems are utilized in construction equipment such as hydraulic excavators, backhoe loaders, and end loaders. Known systems typically use a plurality of open center control valves to controllably actuate the various hydraulic actuators on the vehicle. Normally, such drive systems are controlled through a series of operator control levers which are mechanically or hydraulically coupled to the control valves. The open center control valves give the system a variable response which is dependent on the load on the actuator. In manually operated systems, this may be desirable because the variable response gives the operator an indication of the load on the actuator. The operator then has a better feel for the operation of the vehicle and can better adjust his/her manipulation of the control levers to achieve the desired result.

However, hydraulic systems employing open center valves are inherently inefficient. The reason for this inefficiency is that there is always some flow from the pump to the tank through each valve. For example, during periods where there is no load upon the hydraulic system, such systems are typically destroked to some minimal level (e.g., 16%). However, some amount of flow must be maintained.

Furthermore, recently a lot of effort has gone into automating or semi-automating the functions of such vehicles. In these automatic or semi-automatic systems, the control characteristics of an open center valve is almost always undesirable. Such systems require consistent control characteristics to ensure constant and predictable operation. One way to achieve constant and predictable results is to use a pressure compensated closed center valve. Pressure compensated valves use pressure feedback to achieve consistent control characteristics. However, the operator loses the sense or "feel" of the load. Furthermore, the operator loses the ability to effectively modulate the pressure, and therefore the operator's efficiency decreases.

However, in such systems it has been found desirable to have drive systems which can exhibit both control characteristics. For example, for a system adapted to perform in manual and automatic modes, it may be desirable to have certain hydraulic circuits operating with open center control characteristics in the manual mode and operating with pressure compensated closed center control characteristics in the automatic mode.

The subject invention is directed at overcoming one or more of the problems as set forth above.

DISCLOSURE OF THE INVENTION

In one aspect of the present invention, an apparatus for controllably actuating at least one hydraulic actuator is provided. The apparatus controllably provides pressurized hydraulic fluid to the hydraulic actuator through a closed center spool valve. The apparatus receives an operating signal and a pump pressure signal and responsively controls the output of a variable flow pump.

In another aspect of the present invention, an apparatus for controllably actuating at least one hydraulic actuator is provided. The apparatus controllably provides pressurized hydraulic fluid to the hydraulic actuator through a closed center spool valve. The apparatus receives an operating signal, a pump pressure signal, and a mode signal and responsively controls the output of a variable flow pump.

BEST MODE FOR CARRYING OUT THE INVENTION

Figure 1:
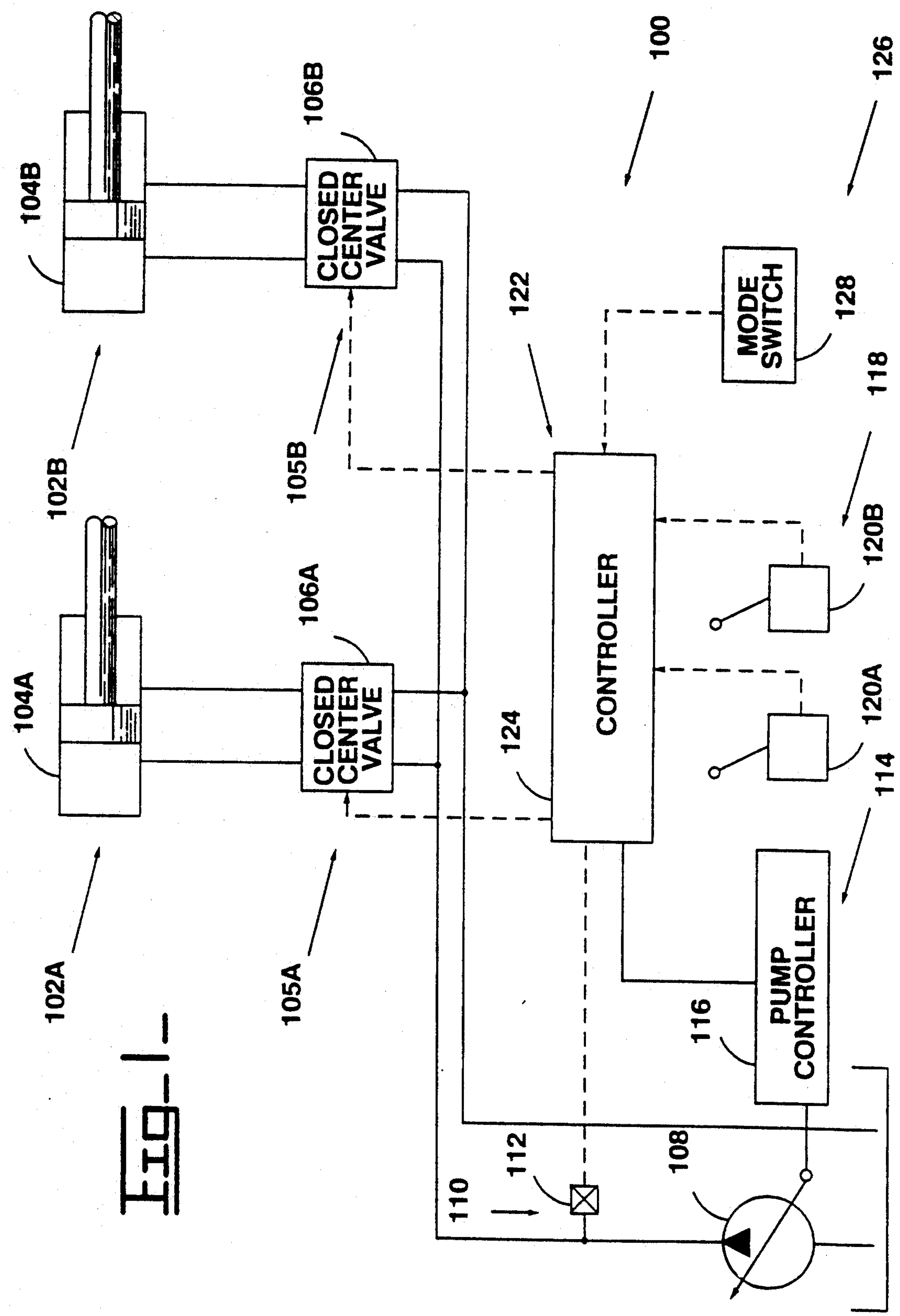
FIG. 1 is a stylistic representation of a hydraulic circuit with two hydraulic actuators, a variable flow pump, and a controlling means, according to an embodiment of the present invention.

With reference to FIG. 1, the present invention or apparatus 100 is adapted to control a hydraulic circuit with at least one hydraulic actuator 102. For simplicity and purposes of illustration, the apparatus is shown as having two linear hydraulic actuators or hydraulic cylinders. However, the apparatus 100 may be adapted to control a hydraulic circuit with other types of hydraulic actuators, e.g., the rotary hydraulic actuator used to control the rotary motion of a hydraulic excavator.

The apparatus 100 includes means 105A,105B for controllably providing pressurized hydraulic fluid to each hydraulic actuator 104A,104B. Each providing means 105 includes a closed center spool valve 106A,106B. Each providing means 105A,105B may also includes a pilot valve (not shown). In one embodiment, the pressurized hydraulic fluid providing means 105A,105B are connected in parallel, as shown. However, the present invention is not limited to any such hydraulic circuit arrangement. For example, the the pressurized hydraulic fluid providing means 105A,105B may be connected in series or a combination of serial and parallel connections may be used.

Figure 4:
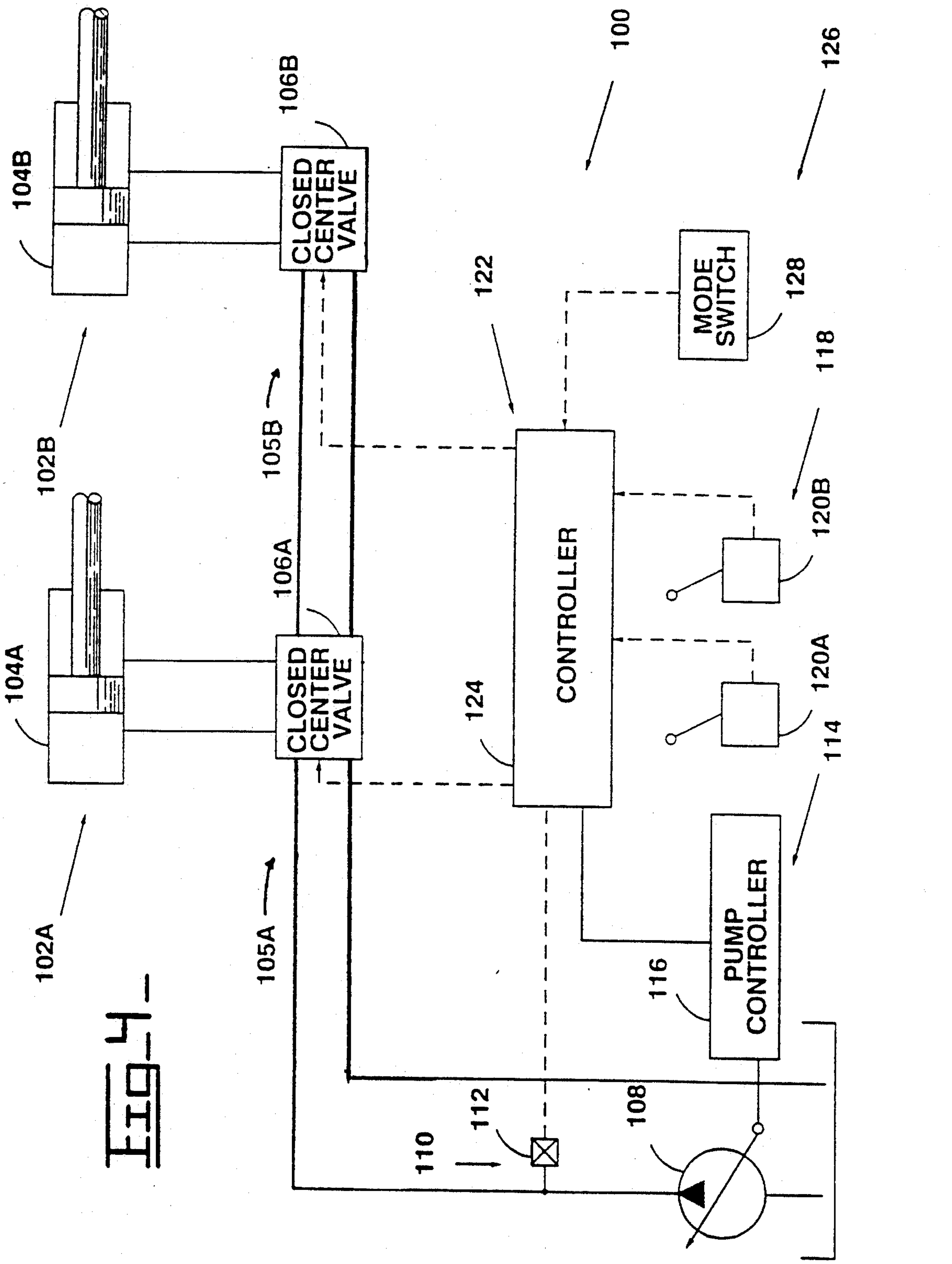
FIG. 4 is a stylistic representation of a hydraulic circuit with two hydraulic actuators, a variable flow pump, and a controlling means, according to another embodiment of the present invention.

A simplified diagram of a hydraulic circuit in which the pressurized hydraulic fluid providing means 118 are connected in series is shown in FIG. 4. For simplicity like elements in FIGS. 1 and 4 are labeled alike. Such parallel and serial systems, and variations thereof, are well known in the art and are therefore not further discussed.

A means 118 produces at least one operating signal. The operating signal producing means 118 includes an operator control handle 120A,120B associated with each hydraulic actuator 102A,102B. In one embodiment, the operator control handles 120A,120B are mechanically coupled to the respective control valve 106A,106B. Position sensors (not shown) are used to sense the position of each control handle and to relay electronic signals to the controlling means, 122. Typical position sensors include variable resistors. In an other embodiment, the operator control handles 120A,120B are electronic joysticks and the control valves are electronically actuated spool valves. The electronic joysticks feed electronic signals to a control means 122 and the control means 122 control the actuation of the control valves 106A,106B. In still another embodiment, the operator control handles 120A,120B are electronic joysticks and the providing means 105A,105B include electronically actuated pilot valves (not shown).

A means 110 senses the pump pressure and responsively produces a pump pressure signal. In the preferred embodiment, the pump pressure sensing means 110 includes a pressure sensor 112 which feeds an electronic signal to the controlling means 122.

The controlling means 122 receives the operating signal or signals from the operating signal producing means 118 and the pump pressure signal from the sensing means 110 and responsively produces a flow command signal.

The apparatus 100 further includes a variable flow pump 108 connected to the pressurized hydraulic fluid providing means 105.

A means 114 receives the flow command signal and responsively controls the output of the variable flow pump 108, as described below. In the preferred embodiment, the pump controlling means 114 includes a pump controller 116. The pump controller 116 receives the flow command signal and responsively controls the output of the pump 108. The pump controller 116 may be a hydro-mechanical or electro-hydraulic control device.

In the preferred embodiment, the controlling means 122 includes a microprocessor-based controller 124. Preferably, the controller 124 receives the operating signals from the control levers 120A,120B. The controlling means 122 has two modes of operation. Under a first mode, the apparatus 100 modulates the flow command signal, and therefore, the output of the variable pump 108 via the flow command signal to the pump controller 116. In the first mode, the output of the pump 108 is modulated as a function of the operating signals and the pump pressure signal. Under a second mode, the pump's output is modulated as a function of the operating signals only.

A means 126 produces a mode signal. Preferably, the mode signal indicates whether or not the flow command signal is to be modulated as a function of the pump pressure signal. In the preferred embodiment, the mode indicating means 126 includes a mode switch 128. The mode switch 128 is adapted to produce a mode signal. The mode signal has a value belonging to a set of values having a first value. Preferably, the mode signal is equal to 1 (one) corresponding to the first mode and equal to zero (0) corresponding to the second mode.

Figure 2A:
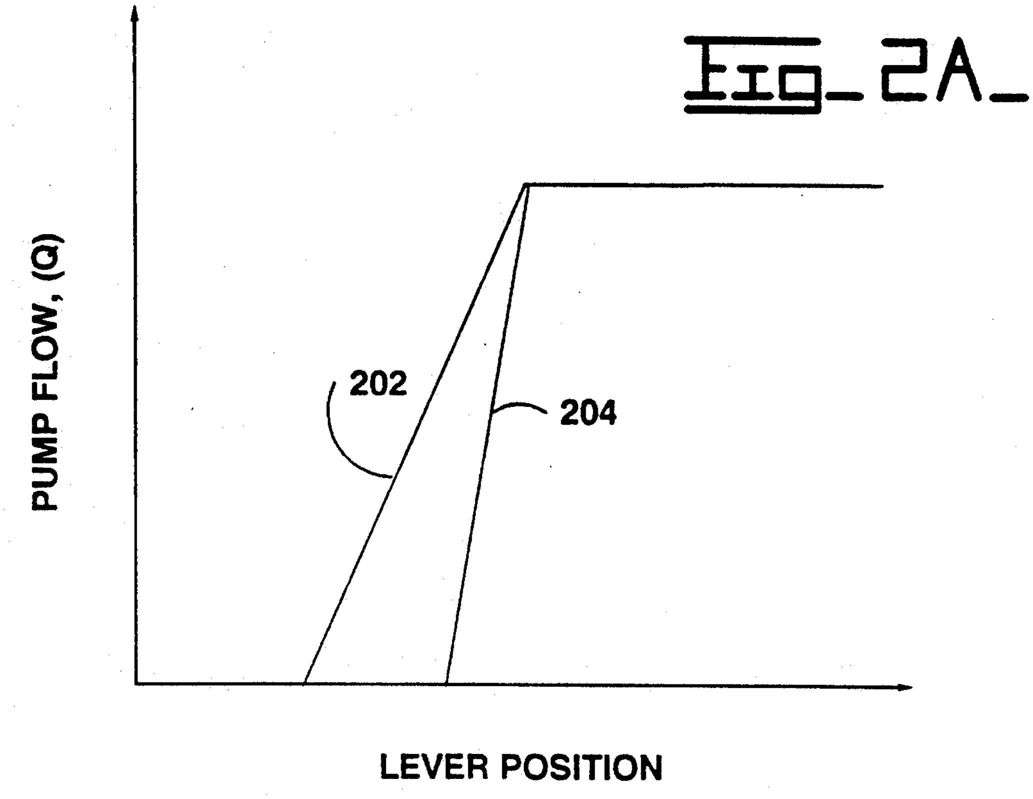
FIG. 2A is a graph illustrating the pump flow control characteristics of the hydraulic circuit of FIG. 1, according to an embodiment of the present invention.
Figure 2B:
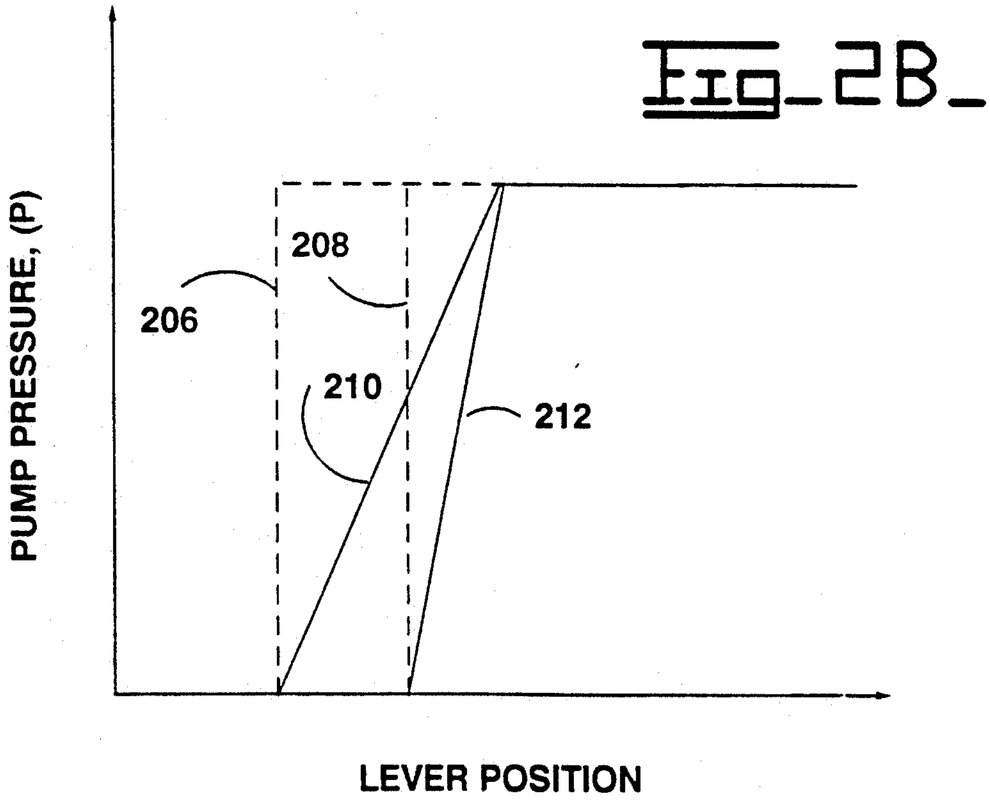
FIG. 2B is a graph illustrating the pump pressure control characteristics of the hydraulic circuit of FIG. 1, according to an embodiment of the present invention.

With reference to FIGS. 2A and 2B, the control characteristics of the apparatus 100 under each mode for various pump pressures are illustrated. If operation of the control system 100 is to be in the second mode as indicated by the mode indicating means 126, the flow command signal is a function of the operating signal or signals only. With reference to FIG. 2A, the system's flow characteristics is illustrated by a first flow curve 202. Since the flow command signal is not affected by pump pressure, the pump's output is a function of the control levers only. For simplicity, the flow characteristics of the control valves 106A,106B are shown as being linear. However, the flow characteristics may be a more complex function, for example, nonlinear. The most notable characteristic of the first flow curve 202 is that when the control system is operating in the second mode, the flow characteristics and the flow gain exhibited is constant for all pump pressures. With reference to FIG. 2B, the pressure characteristics of the control system 100 when operating in the second mode is illustrated by the first and second pressure curves 206,208. As shown, the pressure cannot be controlled or limited by the control levers 120A,120B.

When operating in the first mode, the control system 100 modulates the output of the variable flow pump 108 as a function of the operating signal or signals and the pump pressure signal. The control system 100 operates on different pump flow characteristic curves for different pump pressures. For example in FIG. 2A, the first pump flow characteristic curve 202 represents the pump characteristics under a first pump pressure: $P_1$ and a second pump flow characteristic curve 204 represents the pump characteristics under a second pump pressure: $P_2$, where $P_2 > P_1$. The pump pressure characteristics for various pump flows are shown by the third and fourth pump pressure characteristic curves 210,212.

Figure 3:
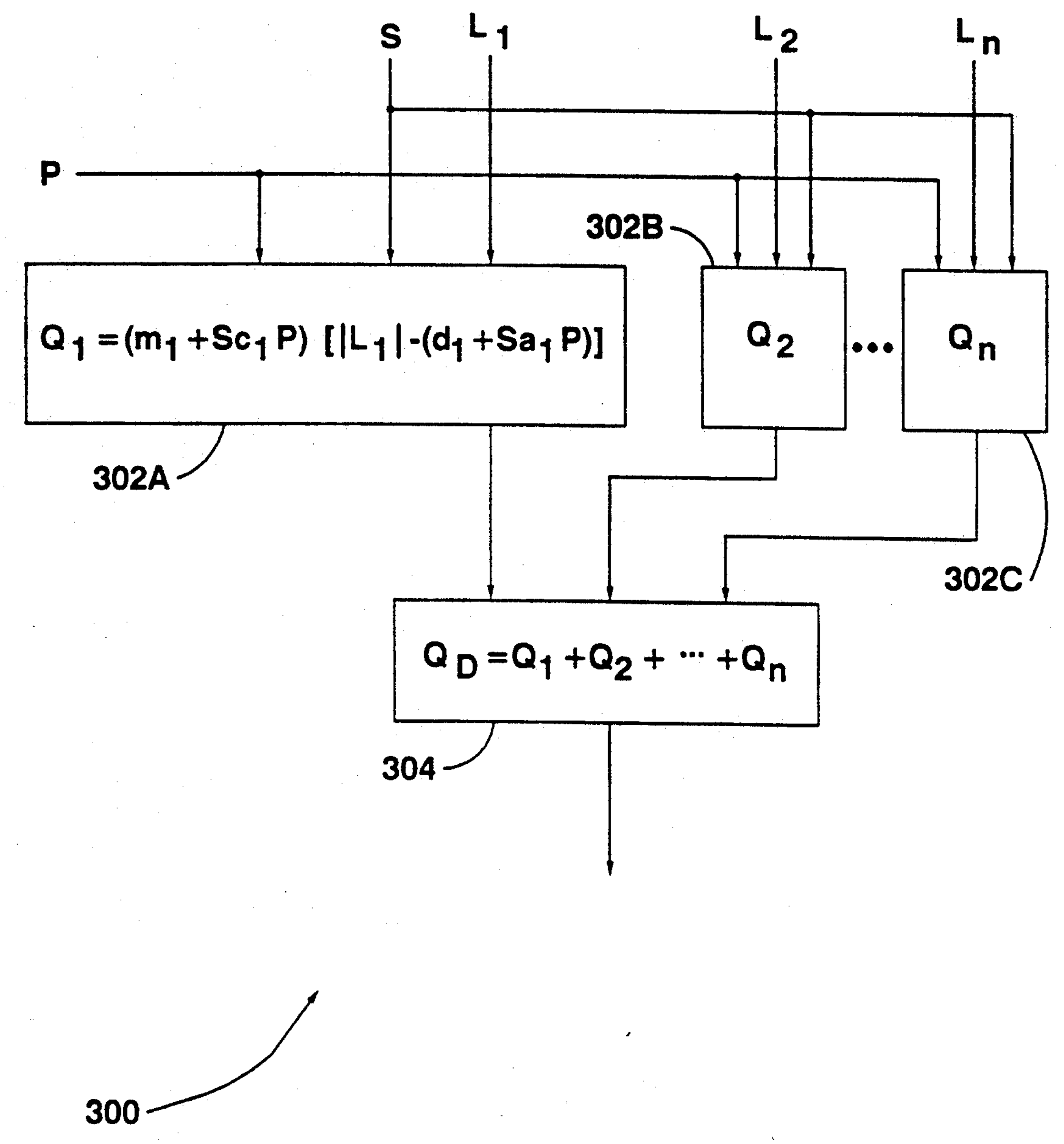
FIG. 3 is a block diagram of a control algorithm for the controlling means of FIG. 1, according to an embodiment of the present invention.

With reference to FIG. 3, the controlling means 122 determines a flow command signal for each hydraulic actuators 102. There are n actuators and the flow command signal is represented by $Q_n$. In the preferred embodiment, the individual flow command signals are determined in the control blocks 302 by:

$$Q_n = (m_n + Sc_nP)[|L_n| - (d_n + Sa_nP)] \qquad \text{EQN. 1}$$

where $m_n$, $c_n$, $d_n$, and $a_n$ are constants, P is the pump pressure, S is the mode signal, and $L_n$ is the operating signal. The mode signal, S, is equal to one (1) in the first mode and zero (0) in the second mode. Therefore, when the controlling means 122 is operating in the second mode, the individual flow commands are not affected by pump pressure. EQN. 1 then becomes:

$$Q_n = (m_n)(|L_n| - d_n) \qquad \text{EQN. 2}$$

The individual flow commands are summed to determine the total pump flow command in control block 304:

$$Q_D = Q_1 + Q_2 + \ldots + Q_n \qquad \text{EQN. 3}$$

INDUSTRIAL APPLICABILITY

With reference to the drawings and in operation, the present invention or apparatus 100 is adapted to controllably operate the output of the variable flow pump 108 of a hydraulic circuit with at least one hydraulic actuator 102 and a corresponding closed center valve 106.

An operator identifies the desired mode through a mode indicating means 126. The controlling means 122 is responsive to the mode indicating means 126 and controls the output of the variable flow pump accordingly.

For example, the operator may indicate that the hydraulic system is to be operated in a manual mode in which it is desirable for the valves to have operating characteristic similar to those of open center valves. In this mode, the output of the pump 108 is modulated as described above. This allows the operator to modulate the pump's pressure along the pressure curves 210,212 through operation of the control levers.

The controlling means 122 determines individual pump flow commands corresponding to each providing means 105A,105B. The controlling means 122 sums the individual flow commands to determine a total flow command signal.

Other aspects, objects, and features of the present invention can be obtained from a study of the drawings, the disclosure, and the appended claims.

I claim:

1. An apparatus for controllably actuating at least two hydraulic actuators, comprising:

means for providing pressurized hydraulic fluid to said hydraulic actuators, said providing means including respective closed center spool valves;

a variable flow pump connected to said pressurized hydraulic providing means;

means for receiving a pump flow command signal and responsively controlling an output of said variable flow pump;

means for producing a plurality of operating signals corresponding to respective hydraulic actuators;

means for producing a mode signal, said mode signal having one of a set of values, said set including at least a first value;

means for sensing the pump pressure and responsively producing a pump pressure signal;

controller means for receiving said pump pressure signal, said operating signals and said mode signal;

said controller means producing said pump flow command signal, said pump flow command signal being a function of said pump pressure signal and said operating signals when said mode signal has said first value, said flow command signal being a function of said operating signals if said mode signal is other than said first value;

wherein said operating signal producing means includes a plurality of operator control levers corresponding to respective hydraulic actuators;

and wherein said controlling means includes means for determining individual pump flows corresponding to each of said control valves as a function of said plurality of operating signals and said pump pressure signal.

2. An apparatus, as set forth in claim 1, wherein said pressurized hydraulic fluid providing means includes a plurality of closed center spool valves connected in parallel.

3. An apparatus, as set forth in claim 1, wherein said pressurized hydraulic fluid providing means includes a plurality of closed center spool valves connected in series.

4. An apparatus, as set forth in claim 1, wherein said control valves are electrically actuated spool valves.

5. An apparatus, as set forth in claim 1, wherein said operator control levers are mechanically coupled to said control valves.

* * * * *